(12) United States Patent
Jun

(10) Patent No.: US 11,711,457 B2
(45) Date of Patent: Jul. 25, 2023

(54) SYSTEM FOR PROVIDING SOUND SOURCE REPRODUCTION INFORMATION

(71) Applicant: MUSICMOB CO., LTD., Seoul (KR)

(72) Inventor: Heon-Joo Jun, Seoul (KR)

(73) Assignee: MUSICMOB CO, LTD., Seoul (KR)

( * ) Notice: Subject to any disclaimer, the term of this patent is extended or adjusted under 35 U.S.C. 154(b) by 0 days.

(21) Appl. No.: 17/923,162

(22) PCT Filed: May 6, 2021

(86) PCT No.: PCT/KR2021/005658
§ 371 (c)(1),
(2) Date: Nov. 3, 2022

(87) PCT Pub. No.: WO2021/225379
PCT Pub. Date: Nov. 11, 2021

(65) Prior Publication Data
US 2023/0119203 A1    Apr. 20, 2023

(30) Foreign Application Priority Data
May 7, 2020    (KR) .......................... 10-2020-0054307

(51) Int. Cl.
*H04M 1/72442*    (2021.01)
*H04M 1/72457*    (2021.01)

(52) U.S. Cl.
CPC ... *H04M 1/72442* (2021.01); *H04M 1/72457* (2021.01)

(58) Field of Classification Search
None
See application file for complete search history.

(56) References Cited

U.S. PATENT DOCUMENTS

2009/0304201 A1* 12/2009 Bekiares ............. H04L 65/4046
                                                              381/77
2011/0296506 A1* 12/2011 Caspi .................. H04L 63/0807
                                                              726/6

FOREIGN PATENT DOCUMENTS

| KR | 10-2015-0090306 | 8/2015 |
| KR | 10-2016-0025318 | 3/2016 |
| KR | 10-2017-0088267 | 8/2017 |
| KR | 10-2018-0070471 | 6/2018 |

(Continued)

OTHER PUBLICATIONS

KR Notice of Allowance in Korean Application No. 10-2020-0054307, dated Feb. 24, 2022, 4 pages (with English Translation).

(Continued)

*Primary Examiner* — Hemant S Patel
(74) *Attorney, Agent, or Firm* — Fish & Richardson P.C.

(57) ABSTRACT

The present invention relates to a system for providing sound source reproduction information and has an object to provide a system for providing sound source reproduction information, in which the sound source reproduction information is provided for each user in the order of their distance from each user, and a user selectively browses sound source information of other users reproduced in the vicinity thereof and generates a synchronization request signal for the sound source information, such that reproduction of the sound source may be synchronized between users without performing any settings with each other.

13 Claims, 5 Drawing Sheets

(56) References Cited

FOREIGN PATENT DOCUMENTS

WO     WO 2019229861     12/2019

OTHER PUBLICATIONS

KR Office Action in Korean Application No. 10-2020-0054307, dated Jul. 26, 2021, 12 pages (with English Translation).
International Search Report and Written Opinion in International Appln. No. PCT/KR2021/005658, dated Sep. 6, 2021, 6 pages (with English translation).

* cited by examiner

SYSTEM FOR PROVIDING SOUND SOURCE REPRODUCTION INFORMATION

CROSS-REFERENCE TO RELATED APPLICATION

This application is a National Stage Application under 35 U.S.C. § 371 and claims the benefit of International Application No. PCT/KR2021/005658, having an International Filing Date of May 6, 2021, which claims priority to Korean Patent Application No. KR 10-2020-0054307, having an International Filing Date of May 7, 2020. The disclosure of the prior applications is considered part of the disclosure of this application, and are incorporated in their entirety into this application.

BACKGROUND OF THE INVENTION

1. Field of the Invention

The present invention relates to a system for providing sound source reproduction information, and more particularly, to a system for providing sound source reproduction information, in which the sound source reproduction information is provided for each user in the order of their distance from each user, and a user selectively reads sound source information of another user reproduced in the vicinity thereof and generates a synchronization request signal for the sound source information, such that reproduction of the sound source may be synchronized between users without performing any settings with each other.

2. Description of the Related Art

As well known in the art, in order to output music at a volume sufficient to listen to music in many places where reproduction of data such as music is required, there is a need to provide a speaker with a fairly high output.

However, a speaker with such a level of output is bulky and heavy, such that is it inconvenient to carry the same. In addition, since it is not possible to know when people need to reproduce music, it is difficult to always carry the speaker.

Recently, Bluetooth speakers of various sizes and shapes have been introduced to help users listen to reproduced music. However, since such a Bluetooth speaker also does not have a large output volume, it is difficult to expect a satisfactory level of output unless the case where the music is reproduced in a closed small space.

However, since almost all individuals carry smartphones, if specific data is reproduced simultaneously using the smartphones owned by these individuals, it may be expected to output the sound in a fairly large level.

But, since there are several problems in implementing such a function as described below, it is practically impossible to simultaneously reproduce the data.

First, even if users make a promise to each other and several smartphones try to reproduce specific data at the same time, it is almost impossible to match the reproduction start timings of a plurality of smartphones at the same time. For this reason, it is very difficult to simultaneously reproduce a sound source on the plurality of smartphones.

Second, when several smartphones are already reproducing a specific sound source, even if a user who wants to reproduce the sound source later joins the play group, information on the current reproduction position of the data cannot be known. Therefore, it is not possible to synchronize the sound source, and even if the user knows the current reproduction position, the reproduction position is already changed in real time while the reproduction position is notified to a user who wants to reproduce the sound source ("reproduction user"). Therefore, it is not possible to match the reproduction positions of the sound source to each other in the plurality of smartphones.

As a result, it is almost impossible to synchronize the reproduction position of the sound source because the device performance of each smartphone that receives the reproduction position information of the sound source, in particular, the time it takes to reproduce the data is different for each device.

Further, since there is a difference in the time it takes to reproduce data depending on a speed of the network, simultaneous reproduction of data is more and more difficult.

Meanwhile, in the process of asking and inputting the phone number of the other party in order to synchronize the sound source with each other, when users do not know each other at all, there is a risk of leaking the individual's phone number during this service. For reasons of reluctance in leaking private information, it is actually difficult to simultaneously reproduce the data on the plurality of smartphones.

SUMMARY OF THE INVENTION

In consideration of the above-mentioned circumstances, it is an object of the present invention to provide a system for providing sound source reproduction information, in which the sound source reproduction information is provided for each user in the order of their distance from each user, and a user selectively reads sound source information of another user reproduced in the vicinity thereof and generates a synchronization request signal for the sound source information, such that reproduction of the sound source may be synchronized between users without performing any settings with each other.

In order to accomplish the above object, there is provided a system for providing sound source reproduction information including: a user terminal 2; and a sound source synchronization processing server 40, wherein the user terminal 2 is configured to browse a sound source list provided from the sound source synchronization processing server 40 and select to reproduce a specific sound source, or browse a reproduction list of another person provided from the sound source synchronization processing server 40, transmit a follow-up synchronization request signal for the specific sound source, and receive synchronization data for the sound source from the sound source synchronization processing server 40 to reproduce the same in a synchronized state, and the sound source synchronization processing server 40 is configured to provide a list of selectively reproducible sound sources to the user terminal 2 to reproduce the same, or provide the reproduction list of another person, receive the follow-up synchronization request signal for the specific sound source from the user to extract a reproduction position of the sound source and perform synchronization correction thereon, and transmit sync data to the user terminals 2, such that synchronization of the sound source is performed between a plurality of users.

Preferably, the sound source synchronization processing server 40 arranges sound source reproduction lists of other persons to be transmitted to the respective user terminals 2 in the order of their distance, and transmits the arranged lists to the respective user terminals 2.

Preferably, the sound source synchronization processing server 40 provides the sound source reproduction lists of other persons to be transmitted to the respective user terminals 2 by including nicknames of the other persons.

Preferably, the sound source synchronization processing server 40 includes a sync accumulation information management unit 66 for each user, which is configured to provide sync accumulation information for each sound source by including it in the sound source reproduction lists of other persons to be transmitted to the respective user terminals 2.

Preferably, the sound source reproducible in the user terminal 2 is a non-volatile file including an MP3 file which is not stored in the sound source synchronization processing server 40 but is instead stored in the user terminal 2, or a volatile streaming file provided by the sound source synchronization processing server 40, and data in which a single sound source is reproduced, or a plurality of sound sources are reproduced in connection with each other and reproduced in a follow-up connected and synchronized manner by a selection of the user.

Preferably, the sync data includes information on the reproduced sound source of the user and information on correction data for a reproduction time of the sound source.

Preferably, the user terminal 2 further includes: a first correction time calculation unit 28 configured to calculate a delay time by starting a count from a time when the synchronization data is received from the sound source synchronization processing server 40 to a time when the reproduction is performed through the reproduction driving unit 14; and a synchronization information correction unit 30 configured to correct the reproduction time by applying a correction value calculated by the first correction time calculation unit 28 to the synchronization data.

Preferably, the sound source synchronization processing server 40 includes: a sound source data storage unit 44 configured to store sound source data; a sound source reproduction request signal reception unit 42 configured to receive a reproduction request signal of a specific sound source for each user from the user terminals; a sound source extraction unit 46 configured to extract specific sound source data; a transmission unit 54 configured to transmit the extracted sound source data to the user terminals 2; and a reproduction information management unit 48 configured to manage sound source reproduction information for each user and information of a user who reproduces the sound source.

Preferably, the user terminal 2 further includes: a phone number management unit 20 configured to manage phone number information of acquaintances; and a reproduction information disclosure setting unit 22 configured to set whether to disclose his or her own sound source reproduction information of the user to the phone number of a specific acquaintance.

Preferably, the sound source synchronization processing server 40 further includes: a sync request signal reception unit 56 configured to receive a follow-up synchronization request signal ("sync request signal") for a specific sound source of another person from the user terminal 2; a sound source reproduction information extraction unit 58 configured to extract sound source information and sound source reproduction time; a reproduction point determination unit 60 configured to determine a reproduction point of the sound source; a second correction time calculation unit 62 configured to calculate a time required from a sync request signal reception point in time to a sync data transmission point in time and a communication delay time between the sound source synchronization processing server and the user terminal; and a sync information generation unit 64 configured to generate reproduction time information to which a second correction time is reflected.

Preferably, the sound source synchronization processing server 40 further includes: a reproduction user position information reception unit 50 configured to receive position information of other persons who reproduce the sound source centering around each user from the position information providing server 6 which provides the position information for each user; and a position information processing unit 52 for each user, which is configured to display the position information of other persons who reproduce the sound sources on a screen of the user terminal in the order of their distance from the closest to the farthest centering around each user.

Preferably, the sound source synchronization processing server 40 further includes a reproduction information request processing unit 68 configured to perform API communication with the user terminal 2 to generate a request signal for whether the sound source stored in the user terminal 2 is reproduced and information of the sound source ("sound source information request signal"), wherein the reproduction information request processing unit requests the sound source information request signal to the user terminal only when receiving a request signal of another user who desires the follow-up synchronized reproduction of the sound source.

Preferably, the sound source synchronization processing server 40 further includes a sound source reproduction information reception unit 70 configured to receive sound source information on a sound source which is not stored in the sound source synchronization processing server among the sound sources transmitted from the user terminal 2.

Preferably, the user terminal 2 further includes a reproduction request information share processing unit 32 configured to receive a share request signal for sound source information from the sound source synchronization processing server 40 when reproducing a sound source stored in the user terminal 2, and provide the sound source information to the sound source synchronization processing server 40.

Preferably, the user terminal 2 further includes a reproduction request information share processing unit 32 configured to automatically provide sound source information to the sound source synchronization processing server 40 when reproducing a sound source which is not stored in the sound source synchronization processing server but is instead stored in the user terminal 2.

The system for providing sound source reproduction information according to the present invention has the following advantages. When reproducing a specific sound source through the application installed in each user terminal, information on the sound source may be shared among users by providing the sound source reproduction information and distance information to other users. In addition, when the users want to synchronize the reproduction points, each user may synchronize the reproduction of the same sound source without any separate network settings, and a plurality of users who may have a sense of kinship and a sense of belonging to the same sound source may share physical distance information together. Further, by displaying the number of followed users to be synchronized for each user, it is possible to quantify and confirm the influence of the user who is reproducing each sound source or the reproduced sound source.

In addition, types of sound sources that users enjoy listening to for each local area may be directly identified in real time in an offline state.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF THE INVENTION

Hereinafter, the present invention will be described in detail with reference to the accompanying drawings.

Figure 1:
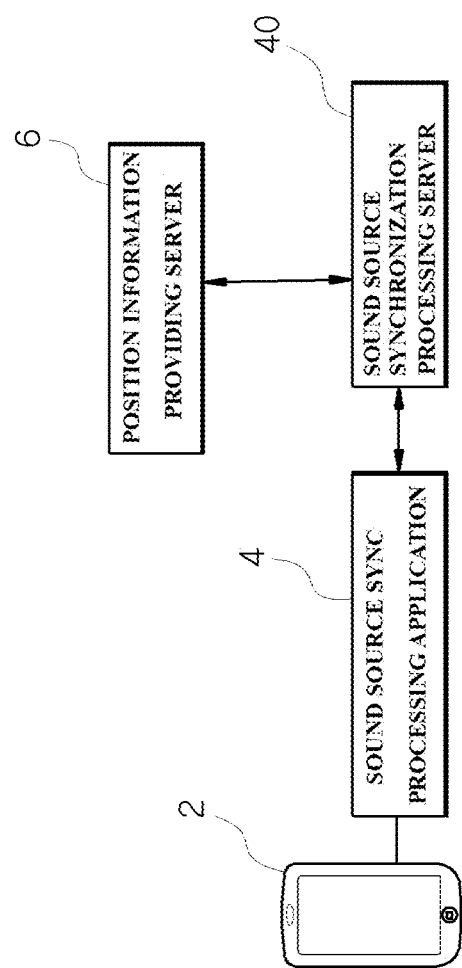
FIG. 1 is a schematic view illustrating a general configuration of a system for providing sound source reproduction information according to an embodiment of the present invention.

FIG. 1 is a schematic view illustrating a general configuration of a system for providing sound source reproduction information according to an embodiment of the present invention.

Referring to FIG. 1, the system for providing sound source reproduction information according to an embodiment of the present invention is a system configured to provide sound source reproduction information, in which the sound source reproduction information is provided for each user in the order of their distance from each user, and a user selectively reads sound source information of another user reproduced in the vicinity thereof and generates a synchronization request signal for the sound source information, such that reproduction of the sound source may be synchronized between users without performing any settings with each other.

More specifically, in accordance with the system for providing sound source reproduction information according to an embodiment of the present invention, identification information for a plurality of users who reproduce the sound source using the service of the present invention and reproduction sound source information of each user are displayed on a screen, such that the user may recognize these information, and the sound source of a specific user is reproduced through a plurality of smartphones of multiple users by following the user in a synchronized state, such that the volume may be increased. Accordingly, a high synergy effect for each user on the sound source reproduction may be generated. When reproducing a dance song, the synchronized sound source is reproduced using a plurality of user terminals together with friends, such that the same sound source data may be reproduced together on a plurality of users' smartphones without carrying an additional apparatus or device.

In addition, the system for providing sound source reproduction information according to an embodiment of the present invention displays the number of followed users who reproduce the sound source by following the sound source reproduced for each user in a synchronized state, thereby directly measuring the popularity of the corresponding sound source and the corresponding user.

To this end, the system for providing sound source reproduction information according to an embodiment of the present invention includes a user terminal 2 and a sound source synchronization processing server 40. The user terminal 2 is configured to browse a sound source list provided from the sound source synchronization processing server 40 and select to reproduce a specific sound source, or browse a reproduction list of another person provided from the sound source synchronization processing server 40, transmit a follow-up synchronization request signal for the specific sound source, and receive synchronization data for the sound source from the sound source synchronization processing server 40 to reproduce the same in a synchronized state. The sound source synchronization processing server 40 is configured to provide a list of selectively reproducible sound sources to the user terminal 2 to reproduce the same, or provide the reproduction list of another person, receive the follow-up synchronization request signal for the specific sound source from the user to extract a reproduction position of the sound source and perform synchronization correction thereon, and transmit sync data to the user terminals 2, such that synchronization of the sound source is performed between a plurality of users.

The user terminal 2 basically opens information so that other users can simultaneously follow and reproduce his or her own sound source through API communication with the sound source synchronization processing server 40 even when a user reproduces and enjoys a specific sound source alone. In addition, the user terminal 2 opens information on a reproduction time so that other users can follow and reproduce the sound source, and exposes the number of users who follow and reproduce the sound source, such that other users may confirm popularity of the corresponding sound source and the corresponding user.

To this end, the user terminal 2 includes a sound source sync processing application 4 installed inside the device. The sound source sync processing application 4 performs communication with the sound source synchronization processing server 40, and transmission/reception of data related to correction of the sound source on the user terminal for synchronization and processing of sound source information or sync information.

Meanwhile, in the system for providing sound source reproduction information according to an embodiment of the present invention, files processed and distributed therein may include both volatile files and non-volatile files without limitation thereof. However, preferably, the sound source synchronization processing server 40 provides a volatile streaming file, such that a user may enjoy a sound source by reproducing it alone, or a plurality of users may enjoy the same sound source together at the same timing by a request for reproduction of sound sources in synchronization with each other from other persons by following the corresponding user ("request for follow-up synchronized reproduction").

In addition, when reproducing non-volatile files such as MP3 files which are not stored in the sound source synchronization processing server 40 but are instead stored in the plurality of user terminals 2, the sound sources may be reproduced in synchronization with each other on the user terminals.

That is, in the system for providing sound source reproduction information according to an embodiment of the present invention, when the same sound source file exists in an A user terminal and a B user terminal, the sound source synchronization processing server 40 requests sound source information and reproduction time information to the A user terminal, corrects the sound source information and reproduction time information, and transmits the corrected information to the B user terminal so that the follow-up synchronized reproduction of the sound source is performed.

Meanwhile, through the system for providing sound source reproduction information according to an embodiment of the present invention, the user may reproduce a plurality of sound sources in connection with each other on the plurality of user terminals, as well as, when reproducing the connected sound sources, other users may reproduce the sound sources in synchronization with each other by following the corresponding user.

In addition, the sync data transmitted to the user terminals 2 of users who desire the follow-up synchronized reproduction by the sound source synchronization processing server 40 includes information on the reproduced sound source of the corresponding user, and the reproduction time of the sound source and correction data for the reproduction time.

That is, the sound source synchronization processing server 40 may identify which sound source is reproduced at which reproduction point in time while managing the streaming file and its reproduction information for each user. In addition, the sound source synchronization processing server 40 corrects the reproduction time information, and provides the corrected information to other users who desire the follow-up synchronized reproduction.

Meanwhile, the sound source synchronization processing server 40 arranges sound source reproduction lists of other persons to be transmitted to the respective user terminals 2 in the order of their distance, and transmits the arranged lists to the respective user terminals 2. When the sound source sync processing application 4 is driven by the user, the sound source synchronization processing server 40 may receive position information and sound source information of other nearby users based on the position information of the corresponding user.

In this case, in order to output the position information of other users on the user terminal 2, only when reproducing a specific sound source through the other user terminals 2, the sound source synchronization processing server 40 provides position information of the other users.

The position information of the other users provided by the sound source synchronization processing server 40 is exposed on a screen on which a plurality of concentric circles drawn centering around each user are displayed. At this time, the sound source synchronization processing server 40 calculates distances between the neighboring users centering around each user, and displays the calculated distances on the screen.

To this end, the system for providing sound source reproduction information according to an embodiment of the present invention further includes a position information providing server 6 configured to provide position information for each user and position information of other neighboring users based on the position of each user to the sound source synchronization processing server 40.

In addition, the sound source synchronization processing server 40 provides the sound source reproduction lists of other persons to be transmitted to the respective user terminals 2 by including nicknames of the other persons. The sound source synchronization processing server 40 displays positions of other neighboring users centering around each user. In this case, it is preferable to display image data and nickname information registered in advance by the user.

Figure 2:
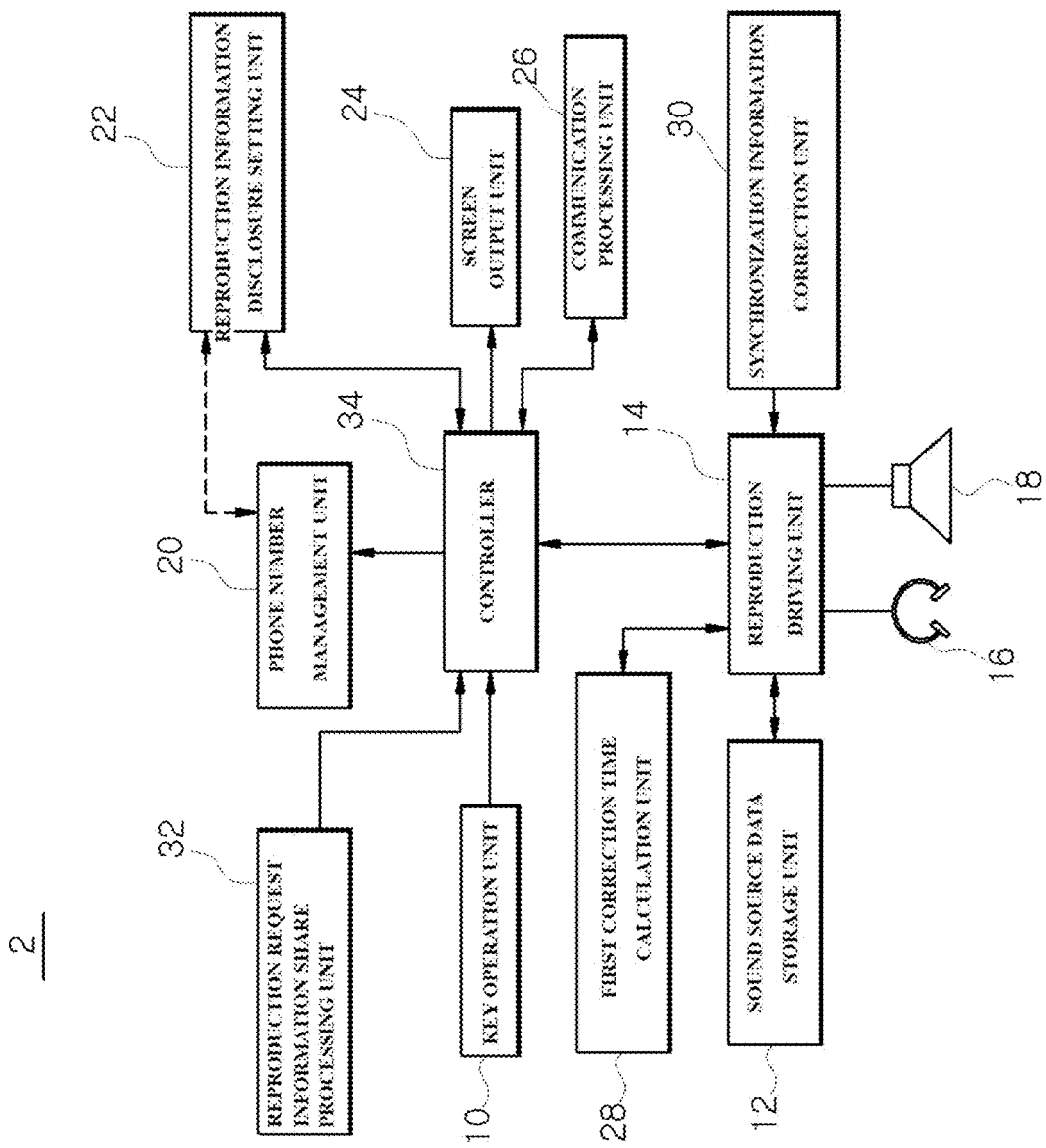
FIG. 2 is a block diagram illustrating a configuration of a user terminal included in the system for providing sound source reproduction information according to an embodiment of the present invention.

FIG. 2 is a block diagram illustrating a configuration of a user terminal included in the system for providing sound source reproduction information according to an embodiment of the present invention.

Referring to FIG. 2, the user terminal 2 included in the system for providing sound source reproduction information according to an embodiment of the present invention includes a key operation unit 10 configured to set information by inputting various key signals, perform selection of the screen and selection and reproduction of the sound, and input key signals including a request for follow-up synchronized reproduction of a specific sound source. Through the key operation unit 10, the user performs a key operation to upload image data exposed to other persons, set a nickname, input a selection signal for an exposure target, browse information selection on a specific user or specific sound source, and input a request signal for follow-up synchronized reproduction of a specific sound source Meanwhile, the user terminal 2 includes a phone number management unit 20 configured to manage phone number information of acquaintances; and a reproduction information disclosure setting unit 22 configured to set whether to disclose his or her own sound source reproduction information of the user to the phone number of a specific acquaintance. Each user may set so that his or her image, nickname, and sound source information to be reproduced are exposed only to specific acquaintances recorded in his or her telephone directory. The setting information is transmitted to the sound source synchronization processing server 40, and information on specific acquaintances is selectively exposed.

In addition, the user terminal 2 includes a screen output unit 24 configured to output various types of information on the screen; a communication processing unit 26 configured to perform communication with the sound source synchronization processing server 40; and a reproduction driving unit 14 configured to drive an earphone 16 or a speaker 18 for reproducing the sound source.

Meanwhile, the user terminal 2 includes a first correction time calculation unit 28 configured to calculate a delay time by starting a count from a time when the synchronization data is received from the sound source synchronization processing server 40 to a time when the reproduction is performed through the reproduction driving unit 14. In fact, when a user wants the follow-up synchronized reproduction of a specific sound source, even when receiving the synchronization data for the sound source transmitted by the sound source synchronization processing server 40, a predetermined delay time actually occurs to drive the speaker 18 or the earphone 16 by the reproduction driving unit 14.

Therefore, the first correction time calculation unit 28 calculates an average delay time and applies it to the actually reproduced sound source, and in order to calculate the correction time, subtracts a communication delay time therefrom by transmitting information on a time required from an actual signal reception point in time to a sound source reproduction point in time through the reproduction driving unit 14 to the sound source synchronization processing server 40. Accordingly, the delay time due to the reproduction driving unit 14 may be calculated.

In addition, the user terminal 2 further includes a synchronization information correction unit 30 configured to correct the reproduction time by applying a correction value calculated by the first correction time calculation unit 28 to the sync data. The synchronization information correction unit 30 applies the correction time calculated by the first correction time calculation unit 28 to the reproduction time transmitted from the sound source synchronization processing server 40, thereby matching it with an actual reproduction time.

Meanwhile, in the system for providing sound source reproduction information according to an embodiment of the present invention, as described above, when reproducing non-volatile files such as MP3 files which are not stored in the sound source synchronization processing server 40 but are instead stored in the plurality of user terminals 2, the sound sources may be reproduced in synchronization with each other on the user terminals.

That is, in the system for providing sound source reproduction information according to an embodiment of the present invention, when the same sound source file exists in the A user terminal and the B user terminal, the sound source synchronization processing server 40 requests sound source information and reproduction time information to the A user terminal, corrects the sound source information and reproduction time information, and transmits the corrected information to the B user terminal so that the follow-up synchronized reproduction of the sound source is performed.

Accordingly, the user terminal 2 further includes a reproduction request information share processing unit 32 configured to receive a share request signal for sound source information from the sound source synchronization processing server 40 when reproducing a sound source stored in the user terminal 2, and provide the sound source information to the sound source synchronization processing server 40.

In the present invention, in order for the users to share reproduction information, the sound source sync processing application 4 may be configured so that, if there is an attempt to reproduce a sound source in the user terminal 2, sound source meta information and reproduction time information are automatically transmitted to the sound source synchronization processing server 40 by the user terminal 2. In addition, the sound source sync processing application 4 may be configured so that the sound source meta information and reproduction time information are transmitted limitedly to the sound source synchronization processing server 40 only when reproducing the sound source which is not stored in the sound source synchronization processing server 40 but is instead stored only in the user terminal 2.

In this case, the sound source sync processing application 4 installed in the user terminal 2 is configured to transmit the sound source meta information and the reproduction information to the sound source synchronization processing server 40, only when independently performing the reproduction except for the case of reproducing the sound source file transmitted from the sound source synchronization processing server 40.

At this time, the reproduction request information share processing unit 32 may be configured to automatically provide the sound source information to the sound source synchronization processing server 40 when reproducing the sound source stored in the user terminal 2 on the user terminal 2 in a state where the sound source is not stored in the server. In this configuration, the reproduction request information share processing unit 32 may be configured to determine whether the sound source reproduced in association with the reproduction driving unit 14 is the sound source provided from the sound source synchronization processing server 40, and if it is not the sound source provided therefrom, automatically transmit sound source information and reproduction time information to the sound source synchronization processing server 40.

In addition, the user terminal 2 may search for sound source information reproduced by a specific acquaintance based on the telephone directory. Next, by selecting the specific acquaintance, the user terminal 2 may receive the sound source information reproduced by the acquaintance from the sound source synchronization processing server 40.

The user terminal 2 further includes a sound source data storage unit 12 configured to store sound source data such as MP3 files, and a controller 34 configured to control each component so as to output information, reproduce the sound source, and perform the follow-up synchronized reproduction of a specific sound source.

Figure 3:
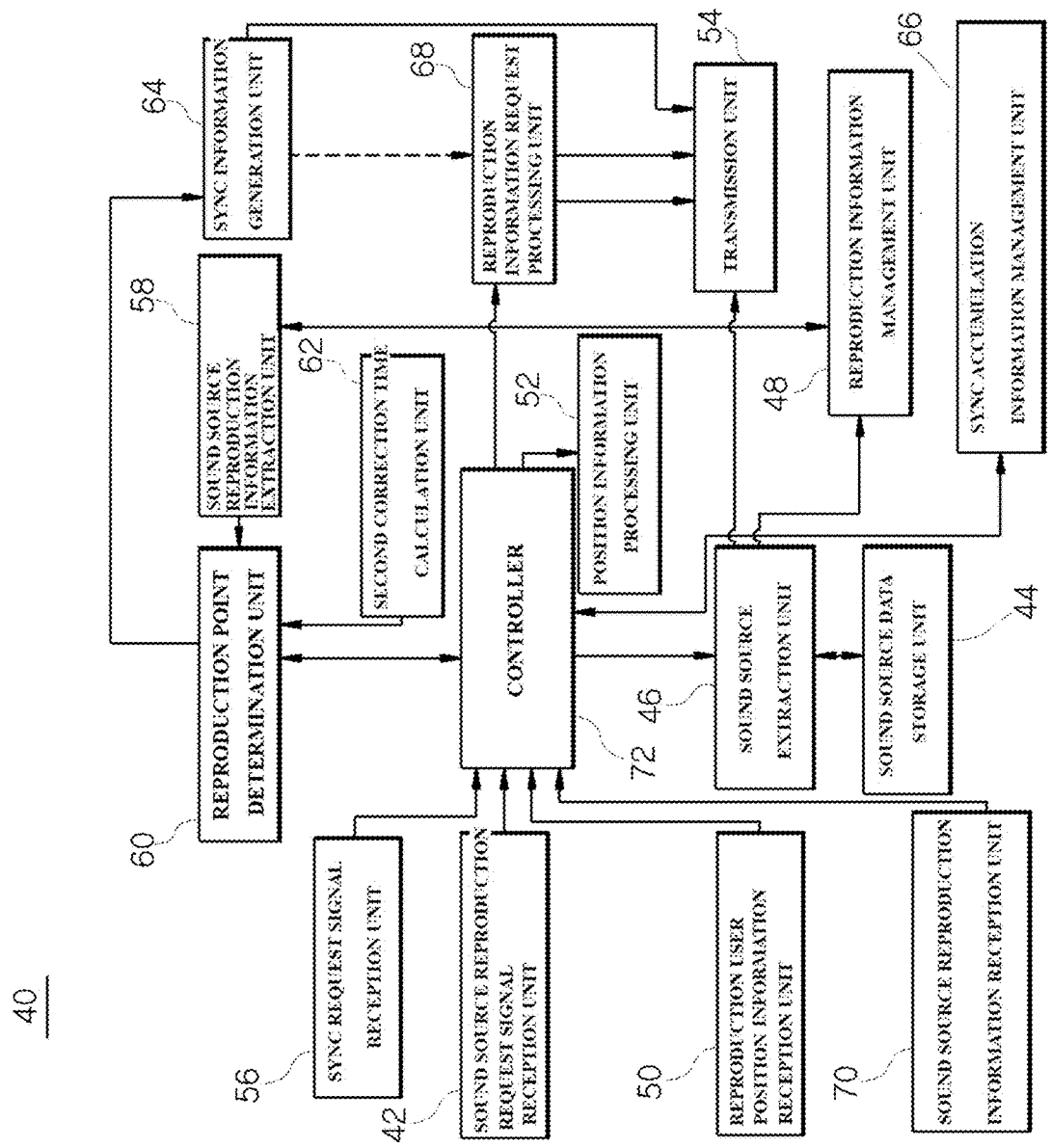
FIG. 3 is a block diagram illustrating a configuration of a sound source synchronization processing server included in the system for providing sound source reproduction information according to an embodiment of the present invention.

FIG. 3 is a block diagram illustrating a configuration of a sound source synchronization processing server included in the system for providing sound source reproduction information according to an embodiment of the present invention.

Referring to FIG. 3, the sound source synchronization processing server 40 includes a sound source data storage unit 44 configured to store sound source data. Preferably, the sound source data is volatile sound source data including a streaming file.

In addition, the sound source synchronization processing server 40 includes: a sound source reproduction request signal reception unit 42 configured to receive a reproduction request signal of a specific sound source for each user from the user terminals 2; a sound source extraction unit 46 configured to extract specific sound source data; a transmission unit 54 configured to transmit the extracted sound source data to the user terminals 2; and a reproduction information management unit 48 configured to manage sound source reproduction information for each user and information of a user who reproduces the sound source.

At this time, since each user has a different reproduction time even for the same sound source, the reproduction information management unit 48 manages the sound source meta information and reproduction time information for each user together.

Meanwhile, the sound source synchronization processing server 40 includes: a sync request signal reception unit 56 configured to receive a follow-up synchronization request signal ("sync request signal") for a specific sound source of another person from the user terminal 2; a sound source reproduction information extraction unit 58 configured to extract sound source information and sound source reproduction time through the reproduction information management unit 48; a reproduction point determination unit 60 configured to determine a reproduction point of the sound source; a second correction time calculation unit 62 configured to calculate a time required from a sync request signal reception point in time to a sync information transmission point in time and a communication delay time between the sound source synchronization processing server and the user terminal; and a sync information generation unit 64 configured to generate reproduction time information to which a second correction time calculated by the second correction time calculation unit is reflected.

At this time, when calculating the delay time between the sound source synchronization processing server 40 and the user terminal 2, the second correction time calculation unit 62 may calculate a communication time through one signal transmission and a feedback signal thereof, and calculate the delay time based on the calculated communication time.

In addition, the sound source synchronization processing server 40 includes: a reproduction user position information reception unit 50 configured to receive position information of other persons who reproduce the sound source centering around each user from the position information providing server 6 which provides the position information for each user; and a position information processing unit 52 for each user, which is configured to display the position information of other persons who reproduce the sound sources on a screen of the user terminal in the order of their distance from the closest to the farthest centering around each user.

Meanwhile, the sound source synchronization processing server 40 includes a sync accumulation information management unit 66 for each user, which is configured to provide sync accumulation information for each sound source by including it in the sound source reproduction lists of other persons to be transmitted to the respective user terminals 2. The user may recognize the position information of users who reproduce the sound source through the sound source sync processing application 4 in the vicinity thereof, reproduced sound source information for each user, and numeric information of other users who perform the follow-up synchronized reproduction of the sound source through the screen of the user terminal 2.

The sound source synchronization processing server 40 includes a reproduction information request processing unit 68 configured to perform API communication with the user terminal 2 to generate a request signal for whether the sound source stored in the user terminal 2 is reproduced and information of the sound source ("sound source information request signal"). In addition, the sound source synchronization processing server 40 further includes a sound source reproduction information reception unit 70 configured to receive sound source information on a sound source which is not stored in its own server among the sound sources transmitted from the user terminal 2.

In this case, it may be configured in such a way that the sound source information request signal transmitted to the user terminal 2 by the reproduction information request processing unit 68 is transmitted only when receiving a request signal of another user who desires the follow-up synchronized reproduction.

Meanwhile, when reproducing non-volatile files such as MP3 files which are not stored in the sound source synchronization processing server 40 but are instead stored in the plurality of user terminals 2, the sound sources may be reproduced in synchronization with each other on the user terminals.

That is, in the system for providing sound source reproduction information according to an embodiment of the present invention, when the same sound source file exists in the A user terminal and the B user terminal, the reproduction information request processing unit 68 of the sound source synchronization processing server 40 requests sound source information and reproduction time information to the A user terminal, corrects the sound source information and reproduction time information, and transmits the corrected information to the B user terminal so that the follow-up synchronized reproduction of the sound source is performed.

At this time, it is preferable that, when a user of the B user terminal desires to browse sound source information reproduced through the A user terminal, the reproduction information request processing unit 68 of the sound source synchronization processing server 40 requests the sound source information and the reproduction time information to the A user terminal, provides the information to the B user terminal, and allows the user of the B user terminal to select whether to perform the reproduction of the sound source by following in the synchronized state.

In this case, of course, the follow-up synchronized reproduction may be performed only when the same sound source file as the corresponding sound source is stored in the B user terminal in advance.

Accordingly, the user terminal 2 further includes the reproduction request information share processing unit 32 configured to receive a share request signal for sound source information from the sound source synchronization processing server 40 when reproducing a sound source stored in the user terminal 2, and provide the sound source information to the sound source synchronization processing server 40. In addition, the sound source synchronization processing server 40 may request reproduction information to the user terminal 2, and by receiving the sound source reproduction information transmitted from the user terminal 2, the synchronization may be performed even on the sound source data maintained in the user terminals 2 only between users through intermediation between both users for the sound source reproduction time of the sound source synchronization processing server 40.

The sound source synchronization processing server 40 further includes a control unit 72 configured to manage the sound source reproduction information for each user, provide the sound source data to each user, output sound source reproduction information of other neighboring users centering around each user using the position information, and control each component so that the follow-up synchronized reproduction of other users is performed.

The function and operation of the system for providing sound source reproduction information according to an embodiment of the present invention having the above-described configuration will be described in detail with reference to the accompanying drawings.

Figure 4:
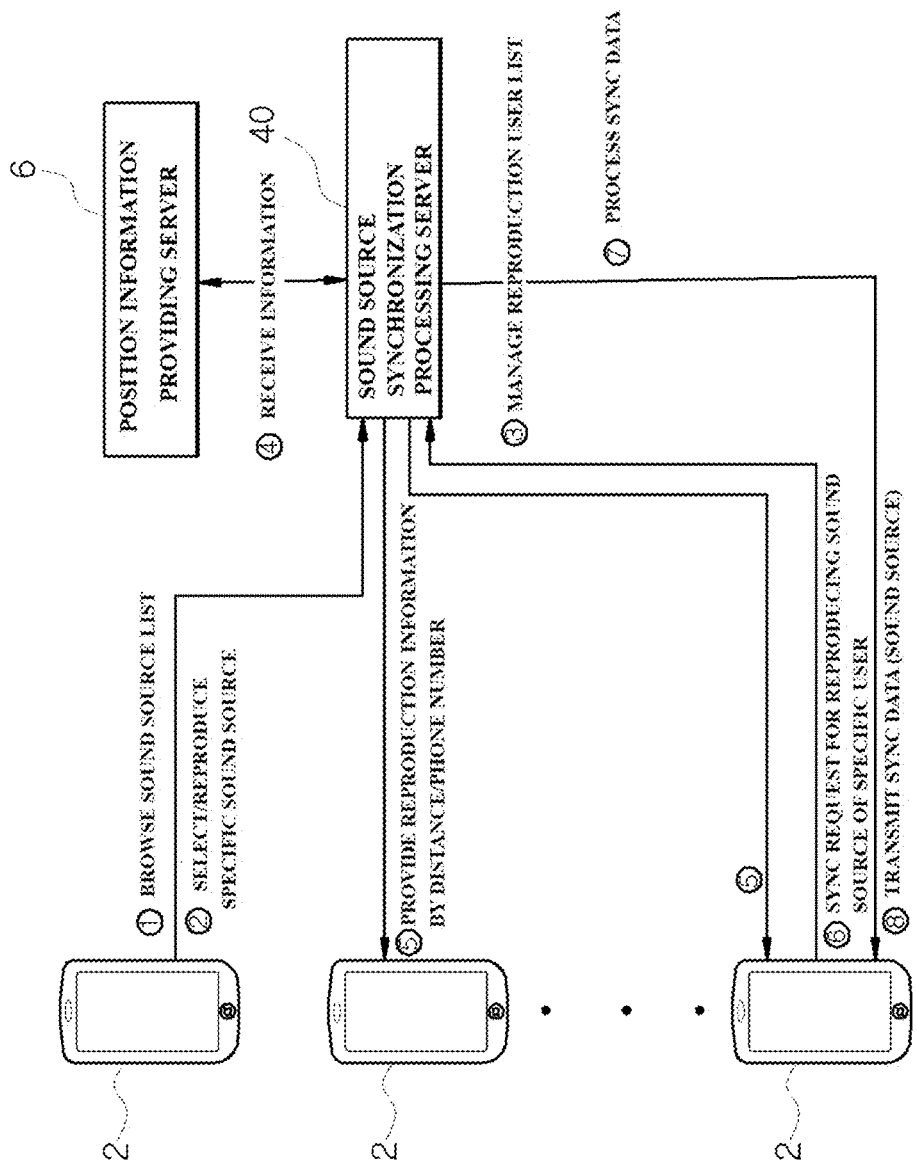
FIG. 4 is a schematic diagram illustrating a state of providing and synchronizing sound source reproduction information through the system for providing sound source reproduction information according to an embodiment of the present invention.
Figure 5:
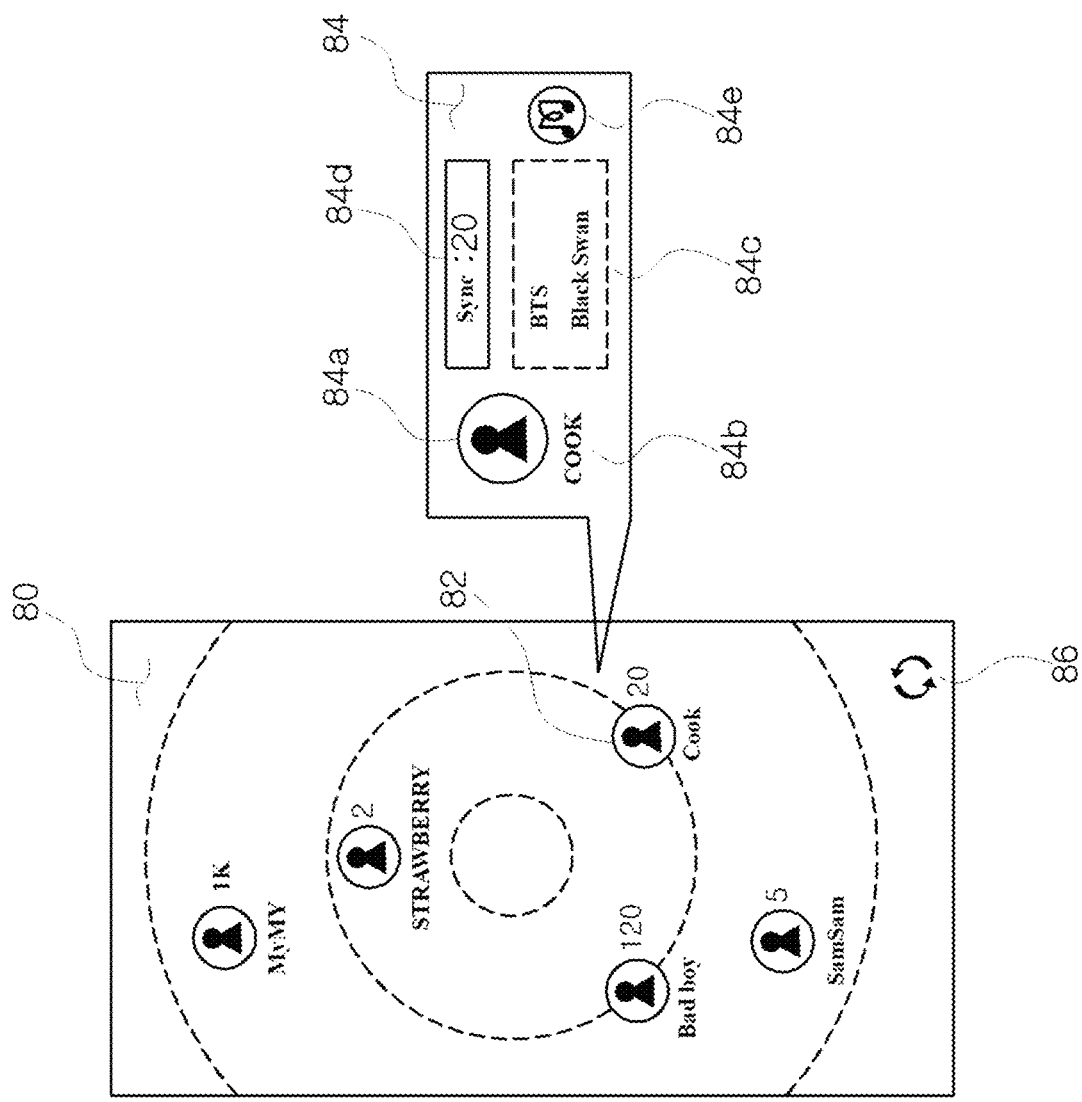
FIG. 5 is a screen illustrating a state of providing sound source reproduction information by distance through the system for providing sound source reproduction information according to an embodiment of the present invention.

FIG. 4 is a schematic diagram illustrating a state of providing and synchronizing sound source reproduction information through the system for providing sound source reproduction information according to an embodiment of the present invention, and FIG. 5 is a screen illustrating a state of providing sound source reproduction information by distance through the system for providing sound source reproduction information according to an embodiment of the present invention.

First, the sound source synchronization processing server 40 provides information on sound sources that can be reproduced through the sound source sync processing application 4 to the user so as to be browsed.

The user confirms the sound source information provided by the sound source synchronization processing server 40 through the user terminal 2, selects a specific sound source, and then generates a reproduction request signal to the sound source synchronization processing server 40.

Then, the sound source synchronization processing server 40 extracts the sound source, transmits the extracted sound source to the user terminal 2, thus to automatically reproduce the same. The sound source is a streaming file, and specifically, a divided volatile file or a streaming file with a limited reproduction period.

In addition, the sound source synchronization processing server 40 receives position information of users and other users who reproduce the sound sources through the sound source sync processing application 4 from the position information providing server 6, and maps each user's nickname and reproduction sound source information to generate information, and transmit the generated information to each user terminal 2.

Then, as shown in FIG. 5, information of a user who reproduces the sound source ("reproduction user information") 82 is output in the order of their distance centering around the corresponding user through a reproduction user information output screen 80 of the user terminal 2. When each user clicks the reproduction user information 82, it is possible to identify which user, with an image 84a and a nickname 84b, is reproducing a sound source of any sound source information 84c through a pop-up window 84.

Preferably, concentric circles are displayed centering around each user on the reproduction user information output screen 80, and each reproduction user information 82 is output thereon. The reproduction user information output screen 80 includes an update button 86 capable of generating an update request signal to the sound source synchronization processing server 40 so as to update the reproduction user information 82 exposed thereon.

In addition, the pop-up window 84 includes a sync button 84e capable of transmitting a sync request signal for the reproduction sound source to the sound source synchronization processing server 40. When the user clicks the specific reproduction user information 82 and then clicks the sync button 84e, sync processing for the sound source is performed by the sound source synchronization processing server 40.

Then, sound source synchronization between users coexisting at positions close to each other may be performed, and even users who do not know each other may reproduce specific sound sources in synchronization with each other within a short distance as well as a long distance. Therefore, the volume is increased due to the reproduction of the sound sources by the plurality of smartphones, and the users may feel a sense of identity and belonging. Above all, when synchronizing the sound sources between the users, there is no need to set any information that is inconvenient and has the potential to leak private information, such as a separate terminal setting or phone number setting between the users. Therefore, the users may enjoy the sound source together while enjoying the freedom that is the essence of singing or music.

Meanwhile, numeric information 84d including the number of the accumulated synchronization reproduction users is displayed in the pop-up window 84 of the reproduction user information 82. Through this, it is possible to estimate how popular the sound source is in the immediate vicinity and how influential the user is.

Further, in the system for providing sound source reproduction information according to an embodiment of the present invention, in addition to sound source data which is stored in the sound source synchronization processing server 40 and can be reproduced by the user, it is possible to synchronize sound source data stored only in the user terminals 2 of the plurality of users. Therefore, synchronization pre-processing may be performed in two ways as described below, and based on this, sound source reproduction information of the acquaintance may be obtained.

Further, it is possible to attempt synchronization for the reproduction sound source of a specific acquaintance.

In the first synchronization pre-processing, it may be configured in such a way that, when the user first reproduces a specific sound source previously stored in the user terminal 2 through the user terminal 2, the reproduction information is automatically transmitted to the sound source synchronization processing server 40.

In this case, the sound source synchronization processing server 40 may provide the reproduction information of the sound source file which is not stored inside its own server but is instead stored in the user terminal to acquaintances stored in the telephone directory of the user. Therefore, any one of the acquaintances may try to perform the follow-up synchronized reproduction for the reproduced sound source information of the corresponding user.

At this time, by a selection of the user, the reproduction information of the sound source which is not stored in the sound source synchronization processing server but is instead stored in the user terminal may be exposed to many and unspecified persons other than the acquaintances of the telephone directory.

That is, to this end, sound source data should be basically stored in advance in the user terminal 2 of the user who tries to perform the follow-up synchronized reproduction. When receiving the request signal for follow-up synchronized reproduction by the sound source synchronization processing server 40, a reproduction time request signal is transmitted to the user terminal 2 on which the sound source is reproduced, and the reproduction time information is provided to the sound source synchronization processing server 40 from the user terminal 2, such that the reproduction time is corrected. Accordingly, the sound source synchronization processing server transmits the completed sync data to the followed users to perform synchronization.

In the second synchronization pre-processing, the user who desires the follow-up synchronized reproduction may transmit a request signal for acquaintance information on the sound source which is not stored in the sound source synchronization processing server and is being reproduced in the user terminal to the sound source synchronization processing server 40, thus to obtain the information.

Similarly, at this time, the sound source synchronization processing server 40, which received the request signal, transmits a request signal to confirm whether the sound source not stored in its own server is reproduced, to each user terminal 2 of a plurality of acquaintances stored in the telephone directory of the user who wants to try to perform the follow-up synchronized reproduction.

If there is reproduction of such a sound source file, the sound source sync processing application 4 of the user terminal 2 may transmit sound source information to the sound source synchronization processing server 40, and the sound source synchronization processing server 40 may transmit the sound source information to the user who attempts to perform the follow-up synchronized reproduction, so that he or she can select whether to perform the follow-up synchronized reproduction.

Therefore, by using the above-described two methods, the system for providing sound source reproduction information according to an embodiment of the present invention may also perform the synchronized reproduction of the sound source which is not provided by the sound source synchronization processing server 40 using the sound source data stored in the user terminal.

Meanwhile, the system for providing sound source reproduction information according to an embodiment of the present invention is not limited to the above-described embodiments, and it will be understood by those skilled in the related art that various modifications may be made therein without departing from the scope of the present invention.

DESCRIPTION OF REFERENCE NUMERALS

2: User terminal
4: Sound source sync processing application

6: Position information providing server
22: Reproduction information disclosure setting unit
32: Reproduction request information share processing unit
40: Sound source synchronization processing server
46: Sound source extraction unit
48: Reproduction information management unit
50: Reproduction user position information reception unit
52: Position information processing unit for each user
56: Sync request signal reception unit
58: Sound source reproduction information extraction unit
60: Reproduction point determination unit
62: Second correction time calculation unit
68: Reproduction information request processing unit
70: Sound source reproduction information reception unit

What is claimed is:

1. A system for providing sound source reproduction information comprising:
    a user terminal; and
    a sound source synchronization processing server,
    wherein the user terminal is configured to browse a sound source list provided from the sound source synchronization processing server and select to reproduce a specific sound source, or browse a reproduction list of another person provided from the sound source synchronization processing server, transmit a follow-up synchronization request signal for the specific sound source, and receive synchronization data for the sound source from the sound source synchronization processing server to reproduce the same in a synchronized state,
    wherein the sound source synchronization processing server is configured to provide a list of selectively reproducible sound sources to the user terminal to reproduce the same, or provide the reproduction list of another person, receive the follow-up synchronization request signal for the specific sound source from the user to extract a reproduction position of the sound source and perform synchronization correction thereon, and transmit sync data to the user terminals, such that synchronization of the sound source is performed between a plurality of users,
    wherein the sound source synchronization processing server arranges sound source reproduction lists of other persons to be transmitted to the respective user terminals in the order of their distance, and transmits the arranged lists to the respective user terminals, and
    wherein the sound source synchronization processing server further comprises:
        a sync request signal reception unit configured to receive a follow-up synchronization request signal for a specific sound source of another person from the user terminal;
        a sound source reproduction information extraction unit configured to extract sound source information and sound source reproduction time;
        a reproduction point determination unit configured to determine a reproduction point of the sound source;
        a second correction time calculation unit configured to calculate a time required from a sync request signal reception point in time to a sync data transmission point in time and a communication delay time between the sound source synchronization processing server and the user terminal; and
        a sync information generation unit configured to generate reproduction time information to which a second correction time is reflected.

2. The system for providing sound source reproduction information according to claim 1, wherein the sound source synchronization processing server provides the sound source reproduction lists of other persons to be transmitted to the respective user terminals by including nicknames of the other persons.

3. The system for providing sound source reproduction information according to claim 1, wherein the sound source synchronization processing server comprises a sync accumulation information management unit for each user, which is configured to provide sync accumulation information for each sound source by including it in the sound source reproduction lists of other persons to be transmitted to the respective user terminals.

4. The system for providing sound source reproduction information according to claim 1, wherein the sound source reproducible in the user terminal is a non-volatile file including an MP3 file which is not stored in the sound source synchronization processing server but is instead stored in the user terminal, or a volatile streaming file provided by the sound source synchronization processing server, and data in which a single sound source is reproduced, or a plurality of sound sources are reproduced in connection with each other and reproduced in a follow-up connected and synchronized manner by a selection of the user.

5. The system for providing sound source reproduction information according to claim 1, wherein the sync data comprises information on the reproduced sound source of the user and information on correction data for a reproduction time of the sound source.

6. The system for providing sound source reproduction information according to claim 1, wherein the user terminal further comprises:
    a first correction time calculation unit configured to calculate a delay time by starting a count from a time when the synchronization data is received from the sound source synchronization processing server to a time when the reproduction is performed through the reproduction driving unit; and
    a synchronization information correction unit configured to correct the reproduction time by applying a correction value calculated by the first correction time calculation unit to the synchronization data.

7. The system for providing sound source reproduction information according to claim 1, wherein the sound source synchronization processing server comprises:
    a sound source data storage unit configured to store sound source data;
    a sound source reproduction request signal reception unit configured to receive a reproduction request signal of a specific sound source for each user from the user terminals;
    a sound source extraction unit configured to extract specific sound source data;
    a transmission unit configured to transmit the extracted sound source data to the user terminals; and
    a reproduction information management unit configured to manage sound source reproduction information for each user and information of a user who reproduces the sound source.

8. The system for providing sound source reproduction information according to claim 1, wherein the user terminal further comprises:

a phone number management unit configured to manage phone number information of acquaintances; and a reproduction information disclosure setting unit configured to set whether to disclose his or her own sound source reproduction information of the user to the phone number of a specific acquaintance.

9. The system for providing sound source reproduction information according to claim 1, wherein the sound source synchronization processing server further comprises:

a reproduction user position information reception unit configured to receive position information of other persons who reproduce the sound source centering around each user from the position information providing server which provides the position information for each user; and a position information processing unit for each user, which is configured to display the position information of other persons who reproduce the sound sources on a screen of the user terminal in the order of their distance from the closest to the farthest centering around each user.

10. The system for providing sound source reproduction information according to claim 1, wherein the sound source synchronization processing server further comprises a reproduction information request processing unit configured to perform API communication with the user terminal to generate a request signal for whether the sound source stored in the user terminal is reproduced and information of the sound source, wherein the reproduction information request processing unit requests the sound source information request signal to the user terminal only when receiving a request signal of another user who desires the follow-up synchronized reproduction of the sound source.

11. The system for providing sound source reproduction information according to claim 1, wherein the sound source synchronization processing server further comprises a sound source reproduction information reception unit configured to receive sound source information on a sound source which is not stored in the sound source synchronization processing server among the sound sources transmitted from the user terminal.

12. The system for providing sound source reproduction information according to claim 1, wherein the user terminal further comprises a reproduction request information share processing unit configured to receive a share request signal for sound source information from the sound source synchronization processing server when reproducing a sound source stored in the user terminal, and provide the sound source information to the sound source synchronization processing server.

13. The system for providing sound source reproduction information according to claim 1, wherein the user terminal further comprises a reproduction request information share processing unit configured to automatically provide sound source information to the sound source synchronization processing server when reproducing a sound source which is not stored in the sound source synchronization processing server but is instead stored in the user terminal.

* * * * *